United States Patent [19]
Cardwell et al.

[11] 3,854,851
[45] Dec. 17, 1974

[54] METHOD FOR SEPARATING NICKEL FROM COBALT IN AQUEOUS SOLUTION

[76] Inventors: Paul H. Cardwell, Zanoni, Va. 23191; James A. Olander, P.O. Box 36, Gloucester Point, Va. 23062

[22] Filed: Apr. 26, 1972

[21] Appl. No.: 247,693

Related U.S. Application Data

[63] Continuation-in-part of Ser. No. 40,564, May 26, 1970, abandoned, and a continuation-in-part of Ser. No. 40,565, May 26, 1970, abandoned, and a continuation-in-part of Ser. No. 40,587, May 26, 1970, abandoned, and a continuation-in-part of Ser. No. 40,590, May 26, 1970, abandoned, and a continuation-in-part of Ser. No. 40,586, May 26, 1970, abandoned, and a continuation-in-part of Ser. No. 40,585, May 26, 1970, abandoned.

[52] U.S. Cl.............. 423/24, 423/49, 423/139, 423/150, 423/149, 423/44, 75/101 BE
[51] Int. Cl.... C01g 3/00, C01g 51/02, C01g 53/00, C01g 45/00
[58] Field of Search ............ 423/49, 139, 138, 150, 423/24; 23/312 ME; 75/101 BE, 119, 117

[56] References Cited
UNITED STATES PATENTS

| | | |
|---|---|---|
| 3,666,446 | 5/1972 | Cook et al. ................. 75/101 BE |
| 3,479,378 | 11/1969 | Orlandini et al. ............ 75/101 BE |
| 2,658,813 | 11/1953 | Whitehouse et al. ................. 423/49 |
| 2,752,299 | 6/1956 | Cooper ................................. 423/49 |
| 2,777,755 | 1/1957 | Eberhardt ............................. 423/49 |
| 3,085,875 | 4/1963 | McCarroll............................. 423/49 |
| 3,128,156 | 4/1964 | Long et al......................... 75/101 BE |
| 3,169,856 | 2/1965 | Mero ................................... 75/119 |
| 2,224,873 | 12/1965 | Swanson ......................... 75/101 BE |

Primary Examiner—Herbert T. Carter
Attorney, Agent, or Firm—Lilling & Siegel

[57] ABSTRACT

A process is provided for separating nickel and cobalt individually from a solution comprising nickel, cobalt and manganese halides. The process comprises extracting cobalt halides and some manganese halides with an organic amine at a pH of at least about 3 and separately stripping cobalt and manganese from the extract. Nickel is extracted from the solution with a liquid ion exchange solution.

11 Claims, 1 Drawing Figure

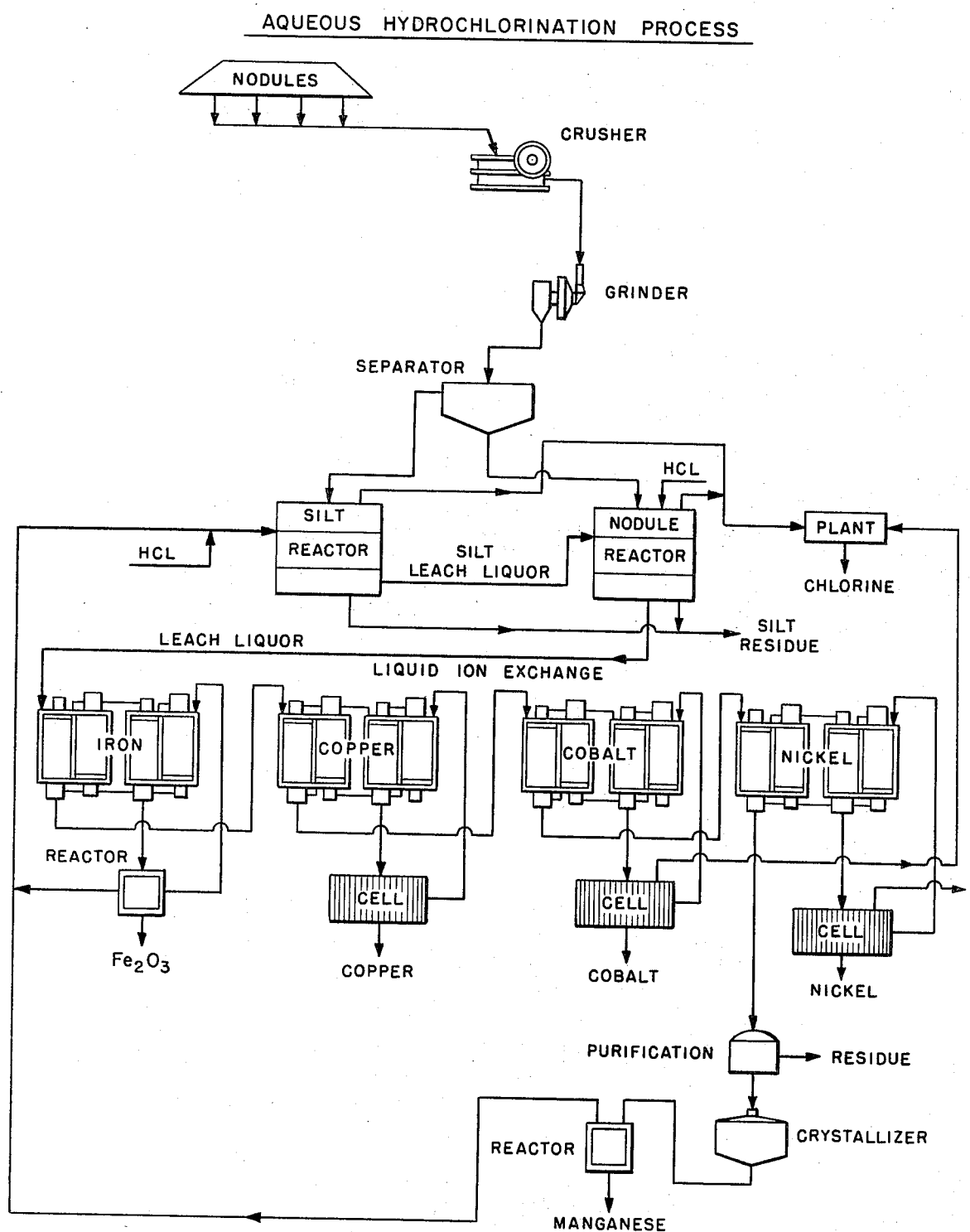

METHOD FOR SEPARATING NICKEL FROM COBALT IN AQUEOUS SOLUTION

This application is a continuation-in-part of copending applications, Ser. No. 40,564, filed May 26, 1970, and now abandoned; Ser. No. 40,565, filed May 26, 1970, and now abandoned; Ser. No. 40,587, filed May 26, 1970, and now abandoned; Ser. No. 40,590, filed May 26, 1970, and now abandoned; Ser. No. 40,586, filed May 26, 1970, and now abandoned; Ser. No. 40,585, filed May 26, 1970, and now abandoned.

With the increased awarness on the part of both the public and the metals industry of the ecological dangers that can arise from continued surface mining of minerals and the increased problems of pollution caused by the refining procedures required for most ores mined from the land, industry has been interested for several years now in the mining of minerals from the sea. This has been an extremely elusive target up to the present. The directions taken have included both attempts to wrest minerals directly from solution in sea water and the mining of ores which are available on the floor of the ocean. These do not require any stripping of the surface but can merely be scooped up or in other ways removed from the surface without actually rending the earth's surface.

Ocean floor nodules have been known since they were first collected in the first half of the 1870s. They have been studied by many workers in an attempt to determine their composition, and after their composition had been determined to try to decipher ways to wrest from their peculiar structure the valuable metals contained therein. It is presently believed that these nodules are actually creations of the sea; they are somehow grown from the metal compounds which are dissolved in sea water, generally in the form of metal oxides. The nodules are formed in an extremely complex crystal matrix of iron and manganese oxides: tiny grains of each oxide of a size and type which are substantially impossible to separate with presently available physical means. These iron and manganese oxides from the crystalline structure within which are held, by means not precisely known, other metal compounds, most likely oxides, including those of nickel, copper and cobalt, as the main ingredients, followed by chromium, zinc, tin, vanadium, and many more elements, including the rare metals silver and gold.

The precise chemical composition of the nodules vary depending upon their location in the ocean. The variation apparently is caused by differences in temperature in various places, differences in composition of sea water, perhaps caused by the pressure and temperature variations at different depths and composition of adjacent land areas; variations in the amount of oxygen which is present in the water in different locations and perhaps other variables not readily apparent to observers. Generally, however, in almost all cases the metals which are present in major proportions are maganese and iron. A table (in an article entitled "The Geochemistry of Manganese Nodules and Associated Deposits from the Pacific and Indian Oceans" by Croonan and Tooms in *Deep Sea Research* (1969), Volume 16, pages 335 – 359, Pergamon Press (Great Britain) shows the relative compositions of the most valuable metals contained in nodules taken from different areas within the Pacific and Indian Oceans.

In accordance with one aspect of the present invention ocean nodule ore is refined by (1) reacting the nodules under acid, or salt-forming, -selective reducing conditions to form a mixture comprising the water-soluble salts of divalent manganese, copper, nickel, cobalt and trivalent iron; (2) separating out the iron from the products of the salt-forming-reduction reaction; (3) forming an aqueous solution of the metal salts and (4) separating the dissolved salts. Steps (2) and (3) can be in interchangeable chronological order. Encompassed within steps (2) and (3) above are processes wherein a solution of all of the metal halides, including those of iron, cobalt, nickel, copper and manganese, are dissolved in water, and the iron is then removed, therefrom; also encompassed are processes wherein the iron halide is first converted to a water-insoluble material, e.g., iron oxide, and the remaining halides are dissolved in water and the solution separated from the insoluble iron material. If an aqueous solution is formed including dissolved iron, the iron can be separated by drying the solution and then converting the iron salt to iron oxide, by extracting of the iron directly, or by converting the dissolved ferric salt selectively to an insoluble form and removing it from the solution. The iron should be removed because it is present in sufficient quantities to interfere with the separation of the other, more valuable metals.

The acid-selective reduction process of this invention destroys the iron oxide-manganese oxide matrix of the nodule, freeing the various other metal values so that they may be separated out, while maintaining the iron in the more easily eliminated ferric state.

The acidic-selective reduction agents useful in the present procedure can be described as materials which will selectively reduce plus four valence state manganese but not ferric iron and will result in the formation of acid salts, e.g., halides, of the metals which are present. Preferred such agents include single compounds, such as the hydrogen halides, both in the gaseous state and in aqueous solution, and two-component mixtures wherein one component provides the acid effect, i.e., forms the metal salts, e.g., the halide portion, and a second component provides the reducing effect. Such materials include mixtures, e.g., of a halogen as the salt forming with a reducing agent, such as hydrogen, HCl, HBr, or carbon, or a source thereof, such as a hydrocarbon or carbon monoxide. In either of the above general cases, the reaction results in the formation of manganous halide, ferric halide and the halides of the remaining metals which are present in the nodule. Useful halogens include fluorine, chlorine, bromine and iodine; however, because of availability and the economy of combined easy handling and high reactivity, chlorine is preferred. It is gaseous at normal temperatures, it is not overly reactive and it can thus be readily handled, but yet is sufficiently reactive so as to proceed quickly and at a high rate. Chlorine is the preferred halogen whether present as the hydrogen chloride or as the elemental chlorine. However, elemental bromine, iodine and fluorine, and the corresponding halide, e.g., hydrogen bromide, can also be utilized if available.

As the single component acid-selective reducing agent, a hydrogen halide is preferred. Preferably the hydrogen halide is utilized in the gaseous state.

The temperature of reaction is surprisingly, not at all critical as far as the halide formation-selective reduction reaction is concerned. Temperatures of from about −40°C up to about 1,000°C can be successfully used at economic rates of reaction. However, it is preferred to operate at above the boiling point of aqueous HCl, i.e., about 110°C at atmospheric pressure, to avoid the formation of any aqueous liquid during the reaction, or of whichever hydrogen halide is present.

Regardless of the temperature of reaction and method of separation, the chemical reactions are substantially the same and can be summarized by the following reaction equations:

1. $MnO_2 + 4HCl \rightarrow MnCl_2 + 2H_2O + Cl_2$
2. $NiO + 2HCl \rightarrow NiCl_2 + H_2O$
3. $CuO + 2HCl \rightarrow CuCl_2 + H_2O$
4. $Co_2O_3 + 6/HCl \rightarrow 2CoCl_2 + 3 H_2 + Cl_2$, or $CoO + 2HCl \rightarrow CoCl_2 + H_2O$
5. (a) $FeO(OH) + HCl \rightarrow FeOCl + H_2O$ and/or (b) $FeO(OH) + 3HCl \rightarrow FeCl_3 \cdot 2H_2O$ The ferric chloride which is formed during the aqueous hydrogen halide reaction can be separated from the remaining metal chlorides by evaporating the water, heating the salts up to a temperature of at least 200°C in the presence of water, thus forming the insoluble iron oxide. The remaining metal halides can then be redissolved in water and separated from the iron oxide as described above.

Alternatively, ferric chloride can be removed by other methods including extraction, utilizing materials which preferentially take up the iron from solution. Such materials, include, among the preferred compounds organic phosphates and amines. These compounds are generally dissolved in an inert organic liquid, preferably a hydrocarbon, such as aliphatic or aromatic petrolem liquids, in concentrations which can range from about 5 to about 30 percent by volume. It is known that the extractant power of such solutions can be further increased by utilizing a modifier or conditioner, such as an aliphatic alcohol, e.g. isodecanol. See U.S. Pat. Nos. 3,224,873 and 3,449,246.

The organic phosphates which can be used for preferentially extracting iron include preferably the trialkyl phosphates. Such materials have the general formula:

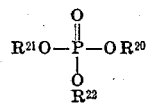

wherein the R groups may be the same or different and are preferably alkyl groups containing 1 to 10 carbon atoms, optimally from 2 to 6 carbon atoms. Examples of such materials include tri-n-butyl phosphate, tri-n-hexyl phosphate, n-butyl-di-n-hexyl phosphate, n-propyl-di-n-butyl phosphate, tri-n-propyl phosphate and triamyl phosphate.

The amines which can be used for preferentially extracting iron include the primary, secondary, tertiary, and quaternary amines, e.g., $R_3NCH_3^+x^-$. Preferably the amines are aliphatic amines wherein each aliphatic group has from 1 to about 30 carbon atoms; preferably the total number of carbon atoms in the molecule being at least about 12 carbon atoms. Examples of the useful amine extractants include primary aliphatic amines having the formula $R - C(CH_3)_2 NH_2$, i.e., N-trialkylmethylamine, where R contains from about 18 to about 24 carbon atoms; secondary amines, such as N-lauryl-N-trialklmethylamine, tertiary amines, such as TIOA triisooctylamine di(-n-octyl)n-hexyl amine, di(-n-hexyl)-n-octylamine, and the quaternary amines, especially in the form of the halide, (chloride), salts, wherein three of the aliphatic groups contain from about 5 to about 15 carbon atoms each and the fourth is preferably a lower alkyl group, e.g., methyl; examples of such preferred compounds include tri($n-C_8^-$ alkyl) methyl ammonium chloride.

The ferric chloride is readily stripped from the phosphate or amine extractant by stripping with water. The thus regenerated extractant can be recycled.

The insoluble material can be separated from the aqueous leach solution containing the soluble metal halides by any of several methods including filtering, decanting, thickening or centrifugation, or any other procedure for separating liquids from solids. The leaching can be carried out by the batch or continuously; especially by counter-current flow. The solution of metal halides is then ready for separation into the individual metal compounds, in accordance with the present invention, preparatory to forming the elemental metals.

Preferably, pure water is not used as the leach liquid. An acid leach liquid is preferably used, one having a pH of not greater than about 4, and preferably not greater than about 3. It has been found that the optimum maximum pH for the leach liquid is about 2. The lower pH tends to increase substantially the proportion of copper halide which is dissolved. It is believed that at higher pHs, copper halide tends to hydrolyze, forming an isoluble product, which will remain behind with the iron oxide and gangue.

Preferably the leach liquid is maintained at substantially ambient temperatures. There is substantially little or no advantage in utilizing higher temperatures. The term "leach liquid" in this specification is applied to the aqueous solution utilized for dissolving water-soluble metal halides in order to separate then from insoluble gangue and iron oxides following a vapor-phase acid-selective reduction reaction.

Because of the rather complex mixture of materials which are obtained from such ocean floor nodules, many of the standard hydrometallurgical methods for separating out metal halides are not directly applicable because of the presence of various interfering ions. However, the following procedures can be utilized for obtaining at least the pure cobalt, copper, nickel and manganese halides.

In the preferred system for separating the halides, the copper halide is first removed from the aqueous solution. In describing the process, the chlorides are used as an example of the halides.

A group of materials known to the art as liquid ion exchange agents, can be utilized for the extraction of copper. Such materials include a group of substituted 8-hydroxyquinolines α-hydroxy oximes and naphthenic acids. The oximes and quinolines generally are preferred because of their ability to separate more cleanly the various metal salts, and because the same compound can be used to extract each of the metals from solution.

The 8-hydroxyquinoline compounds, which are especially useful for the separation of the metal chlorides in accordance with the present process, can generally be defined by the following formula:

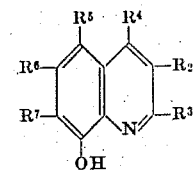

wherein each of the R groups can be hydrogen or hydrocarbon group, or inertly substituted hydrocarbon groups, such as alkenyl, alkyl, alkynyl, cycloalkyl, cycloalkenyl, aryl or combinations thereof, such as alkaryl, aralkyl, aralkenyl, alky -cycloalkyl, etc.

At least one of the R groups however must be a hydrocarbon group. Any inert substituent can be present, as long as it does not adversely affect the solubility of the substituted 8-hydroxyquinolines in organic solvents nor adversely affect the solubility in the organic solvent of the metal chelate formed therefrom.

The resulting metal chelate must remain soluble at least to the extent of approximately 2 percent by weight in the organic solvent.

The preferred position of the hydrocarbyl substituent on the 8-hydroxquinoline nuclear structure is such as to form preferentially a complex with the desired metal ion in the aqueous solution. The sum of the carbon atoms in the R groups must be at least about 8 and can be as high as 24 or more. The preferred R groups are alkylbenzyl groups or beta-alkenyl groups containing from 12 to 18 carbon atoms, preferably attached at the $R^5$, $R_7^6$, or $R^7$ position. The optimum position for substitution is at the $R_7$ position to obtain the highest degree of efficiency. For a more complete description of these hydrocarbyl-substituted 8 -hydroxyquinolines see Republic of South Africa specification No 69/4397 to Budde Jr., et al assigned to Ashland Oil, Inc.

Representative compounds useful in this invention and within the scope of the above general formula are 7-octylbenzyl-8-hydroxyquineline, 7-dodecylbenzyl-8-hydroxyquinoline, 7-nonylbenzyl-8-hydroxyquinoline, 7-ditertiarybutylbenzyl-8 hydroxyquinoline, 7-hexadecyl-8-hydroxyquinoline, 7-octadecyl 8-hydroxyquinoline, 7-hexadecenyl-8-hydroxyquinoline, 7-dibenzyl-8-hydroxyquinoline, 7-dimethyldicyclopentadienyl-8 hydroxquinoline, 7-dicyclopentadienyl-8-hydroxyquinoline, 7-dodecylphenyl-8-hydroxyquinoline, 7-phenyldodecynyl-8-hydroxyquinoline, and the like where one or more of the hydrocarbyl groups R are attached to ring carbon atoms in the 2nd, 3rd, 4th, 5th and 6th positions. Mixtures of these 8-hydroxyquinoline derivatives can be used if desired.

The 8-hydroxyquinolines are preferably utilized in solution in organic solvents, preferably hydrocarbon or chlorinated hydrocarbon solvents. Such preferred solvents include benzene, toluene, xylene, the various commercial mixtures of aromatic hydrocarbon solvents available on the market, aliphatic hydrocarbons solvents such as hexane-heptane mixtures, light fuel oil, kerosene and other hydrocarbons. Chlorinated such hydrocarbon solvents such as chlorobenzene, are useful in this regard. Generally liquid aliphatic, cycloaliphatic, aromatic, cycloaliphatic-aromatic or aliphatic-aromatic hydrocarbons or chlorinated such hydrocarbons can be preferably utilized. Optimally, the solvents have specific gravities in the range of from about 0.65 to 0.95 and mid-boiling points in the range of from about 120° to 615°F (ASTM distillation). However, substantially any liquid can be used as a solvent that meets the following criteria: (1) a solvent for the extracting agent; (2) a solvent for the metal-containing chelate; (3) immiscible with water, and (4) readily separable from water. The extracting compound and the metal-containing such compound are both preferably soluble in the solvent to the extent of at least 2 percent by weight.

The second preferred type of metal extractant are the alpha-hydroxy oximes, which are disclosed inter alia in U.S. Pat. Nos. 3,224,873, 3,276,863 and 3,479,378. These materials have the general formula:

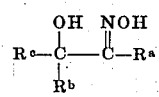

wherein the $R^a$, $R^b$ and $R^c$ groups can be any of a variety of organic, hydrocarbon radicals such as aliphatic and alkyl aryl radicals. $R^b$ can also be hydrogen. Preferably $R^a$ and $R^c$ are unsaturated hydrocarbon or branched chain alkyl groups containing from about 6 to about 20 carbon atoms. $R^a$ and $R^c$ are are unsaturated hydrocarbon or branched chain alkyl groups containing from about 20 also preferably the same, and when alkyl are preferably linked to the central carbon atoms by a secondary carbon atom. $R^b$ is preferably hydrogen or unsaturated hydrocarbon or branched chain alkyl group containing from about 6 to about 20 carbon atoms. The oxime preferably contains a total of from about 14 to about 40 carbon atoms. Useful R, R' and R'' groups include in addition to hydrogen, the mono- and polyunsaturated groups such as heptenyl, octenyl, decenyl, octadecenyl, octadecynyl, ethyl octadecenyl. Alkyl groups include 2-ethylhexyl, 2,3-diethylheptyl, 2-butyldecyl, 2 butylhexadecyl, 2,4-ethylbutyldodecyl, 4-butylcyclohexyl, and the like. Examples of the preferred alpha hydroxy omimes include 19-hydroxyhexatriaconta-9, 27-dien-18-oxime; 5,10-diethyl-8-hydroxytetracecan-7-oxime; 5,8-diethyl-7-hydroxydodecane-6-oxime.

These alpha-hydroxy oximes are also utilized in an organic, water-immiscible solvent, in which they should be soluble to an extent of at least about 2 percent by weight. The useful solvents are set forth above for use with the 8-hydroxyquinoline compounds. The alpha-hydroxy oximes or the 8-hyd oxyquinolines can be present in the solvent in amounts of from about 2 to 50 percent by weight, based on the total solution, but preferably in amounts of from about 2 to about 15 percent by weight.

Solutions of the extracting agents which are known as chelating agents, or "liquid ion exchange agents", generally are improved in their extracting efficiency by the presence of materials known as conditioners. Such conditioners include, long chain aliphatic alcohols, such as capryl alcohol, isodecanol, tridecyl alcohol and 2-ethylhexanol. The modifiers act, it is believed, by improving the phase-separating properties of the organic solvent from the aqueous leach liquid. The conditioners or modifiers, can be present in amounts of up to about 20 percent by volume of solution, and generally are aliphatic or cycloaliphatic of from 6 to 16 carbon atoms.

Beginning with an aqueous leach liquid containing dissolved copper halide, cobalt halide, nickel halide and mangnese halide as the primary solutes, plus a variety of other metal halides in minor concentrations, the extraction of the individual metals can preferably be carried out by the following general procedure.

(1) adjust the pH of the leach liquid to a desirable pH, (2) mix the leach liquid with an immiscible organic liquid containing an extractant specific to a metal at that pH; preferably, copper is extracted initially at a pH of not greater than about 2.5, preferably from about 1.5 to about 2.5, and optimally of from about 1.8 to 2.2; the best results are obtained at a pH of about 2, (3) separate the aqueous raffinate from step (2), adjust the pH as necessary, and mix the raffinate with an immiscible organic liquid containing an extractant specific to another metal at the pH of the aqueous phase. Generally, nickel is extracted at a pH of from about 3 to about 6 and preferably about 3 to about 3.5 with chelating, or liquid ion exchange, agents. At too high a pH, the manganese, nickel and cobalt tend to precipitate and this is preferably avoided. Further, increasing pH too much is expensive, in using up alkaline material.

In accordance with present invention, cobalt is first extracted using a secondary, tertiary or quaternary amine extractant of the type defined above for use to remove iron from solution. The tertiary amines are preferred for extracting cobalt, and especially the trialkyl amines, containing from about 6 to about 12 carbon atoms in each group, such as triisooctyl amine, triisodecyl amine and tricapryl amine. The amine extractant is dissolved in an inert organic liquid in which both the amine and the amine metal salt are soluble in concentrations of at least 2 percent. There can also be present a modifier such as one or more of the higher alcohols described above. The higher alcohols are preferably present in concentrations of from 5 to 30 volume percent. The organic solvents are selected on the same basis as those defined above for use with the oximes and hydroxyquinolines. Aromatic and aliphatic petroleum hydrocarbons are preferred. Nickel is then extracted from the aqueous raffinate using an α-hydroxy oxime or 8-hydroxyquinoline, as defined above at a pH from about 3 to about 3.5.

To more efficiently extract cobalt from the leach liquid using an amine the concentration of halide ions in the leach liquid should be at least about 2N and preferably at least about 4N to form a cobalt tetrahalide complex in the leach liquid. the cobalt tetrachloride complex is preferred.

Each extraction step can be carried out with one or more extraction stages until the desired amount of metal is extracted.

(4) The metal-containing organic extractant phases are stripped of the metal values by contracting with an aqueous stripping solution, generally an acidic solution is used. Generally, following stripping the extracting solution can be recycled to the process.

Copper can be readily stripped by any mineral acid, in an aqueous solution, having hydrogen ion concentration of from about 1N to about 10N and preferably from about 2N to about 6N. The concentration of hydrogen ion must be at least slightly in excess (preferably 5 percent) of the stoichiometric amount needed to substitute for the metal in the extract. The preferred acids include sulfuric acid, nitric acid, and hydrochloric acid. As the acid used determines the metal salt to be formed, this can be a basis for selecting the acid, if a particular salt is desired.

The cobalt can be stripped from the ammine extract using a weakly acidic, i.e., pH of from about 2 to about 3.5, water solution.

Nickle can be stripped using a relatively weak acid aqueous solution, such as the mineral acids or the stronger organic acids, such as chloracetic acid, in a concentration of from about 0.01N to about 3N acid and preferably from 0.1N to about 1.0N.

The aqueous raffinate leadh liquid remaining after the cobalt and nickel are removed contains substantially all of the manganese halide which was leached from the nodule plus minor amounts of halides of other metals.

When using an amine to extract cobalt in accordance with this invention, a certain proportion of manganese can be extracted when present at higher concentrations in the leach liquid. Accordingly, it may be necessary to further treat the extract to separate the manganese from the cobalt to obtain a pure cobalt compound. Manganese can be selectively stripped from the extract or selectively extracted from a weak acid stripping solution, i.e., having a pH of from about 2.5 to about 3.5 which stripped both cobalt and manganese.

Manganese is selectively stripped from the ammine extract utilizing an aqueous chloride solution having a concentration of chloride ion of from about 1N to about 12N and preferably from about 6N to about 12N, and a pH of not greater than 7. Aqueous HCl, of from about 1N to about 12N is most preferred. Generally, the higher the concentration of maganese in the ammine extract, and the lower the organic-to-aqueous phase ratio in the stripping system, the greater should be the chloride concentration.

The cobalt can then be stripped using a weakly acidic aqueous solution. Further concentration of the cobalt solution can be obtained by further extraction using, e.g., a dialkyl phosphoric acid.

When the cobalt and maganese are stripped together from the ammine extract using a weak acid solution, the stripping solution can be extracted to remove manganese. Useful manganese extractants include phosphoric acid diesters having the general formula:

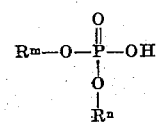

wherein the R groups are hydrocarbyl groups and preferably alkyl groups containing from 6 to about 12 carbon atoms each. Preferred R groups, include 2-ethylhexyl, isodecyl, 22-ethylbutyl and octyl. Examples of useful compounds include di(2-ethylhexyl) phosphoric acid, di(isodecyl) phosphoric acid, (2 ethylhexyl) (2-ethylbutyl) phosphoric acid and di(octyl) phosphoric acid. The phosphoric acid diesters are especially useful in solution, 5 to about 30 percent by volume, in aliphatic or aromatic hydrocarbons of the type described above for use with oximes and hydroxyquinolines preferably, with a modifier.

The above diesters selectively extract manganese when the aqueous phase is at a pH of from about 2.5 to about 3.5. The manganese can be stripped from the phosphoric acid diester extract using an acid stripping solution containing at least a stoichiometric amount of hydrogen ion to replace all of manganese in the extract, and preferably an excess of 1N hydrogen ion. When the concentration of the cobalt in the aqueous raffinate following extraction of the manganese is too low to be fed directly to an electrolytic cell, the concentration can be increased by evaporation or, preferably, by further extraction, using phosphoric acid diesters and further stripping with an aqueous solution, at a pH of from about 3.5 to 7.

As yet another alternative, cobalt can be extracted from the aqueous solution containing manganese and cobalt, at a pH of from about 3.5 to about oximes using one of the oxides or hydroxyquinoles described above.

Referring to the drawing accompanying this application, the drawing is a schematic flow diagram for the aqueous solution hydrohalogenation process.

The nodules as obtained from the ocean floor often are combined with material, of a slit-like nature, consisting primarily of quartz and silicates. The amount of this slit-like material is substantially decreased by crushing, milling and attritional scrubbing. The resulting particulate nodule material can be separated from the silt by conventional means such as a hydroclassifier. The overflow fraction generally contains the silt combined with fines. The silt is therefore separately reacted with HCl to remove these metal values. The underflow from the hydro classifier is then pretreated with an aqueous solution of $FeCl_3$ to remove certain undesirable alkaline substances that may be present and passed to the acid-selective reducing reaction stage.

The reactor, as shown, is a multi-stage reactor system, wherein the nodules are passed counter-currently to the hydrogen halide solution, and the chlorine by-product is vented from each stage.

The reaction with the aqueous hydrogen halide solution proceeds with substantially any concentration of the hydrogen halide. However, to avoid having to handle excessive amounts of water, solutions of less than 1 percent by weight hydrogen halide should not be used. Preferably, a concentration of hydrogen halide of at least 10 percent by weight hydrogen halide is used. Optimally a saturated solution is used, e.g., 36 percent by weight HCl, and additional hydrogen halide vapor bubbled in during reaction. As shown in the drawing, the anhydrous hydrogen halide, exemplified by HCl, is bubbled into alternate stages through the aqueous solution.

The aqueous leach solution having the final reactor stage has a pH of not greater than about 2 to avoid precipitation of copper salt, and usually of from about 1 to about 2.

The final aqueous reaction liquid, containing the dissolved halides of manganese, iron, cobalt, nickel and copper, is then passed to a liquid ion exchange system to remove the iron by counter-current extraction with, e.g., an organic solution of a trialkyl phosphate or an amine. The ferric chloride is extracted from the leach liquid, stripped from the organic extract phase with water, the organic extraction solution is recycled for further use and the aqueous $FeCl_3$ solution is passed to the pretreatment stage for the nodules described above. The iron-free aqueous raffinate is then passed to a liquid ion exchange separation system, to separate the copper from the iron raffinate. Nickel and cobalt halides are separated from the solution by the below-described procedures preparatory to reducing to the respective metals. As shown, the residual copper after the copper remaining after extraction stage is removed by cementation on iron metal. The iron is removed by converting iron chloride to iron oxide.

One form of apparatus for use in fractionally subliming or condensing the respective halides include a set of rotating drums, as condensers, which are each maintained at a temperature below the sublimation temperature of the desired halide. The drums can be equipped with doctor blades which scrape the surface of the constantly rotating drums removing the deposits of the halides and carrying them away for further treatment as necessary.

EXAMPLE 1

An aqueous solution having a pH of about 2.0 is obtained from the leaching of hydrohalogenated-selectively reduced ocean floor nodule ore as explained in Example 4 of the copending commonly assigned application filed contemporaneously herewith. The proportions of the major metals dissolved in the aqueous solutions are as follows:

| Component | Grams per liter as metal |
|---|---|
| manganese chloride | 200 |
| copper chloride | 7.68 |
| nickel chloride | 9.45 |
| cobalt chloride | 1.83 |

The leach liquor was passed countercurrently to an organic extracting liquid through 5 mixer-settler stages, at an organic to-aqueous ratio of 6 to 31.5 by volume. The organic extraction liquid was a solution of 10 percent by volume of an alpha-hydroxyoxime (5,8-diethyl-7-hydroxy dodecane-6-oxime, known as LIX-64N), plus 20 percent by volume isodecanol, in Napoleum solvent. Napoleum is a proprietary mixture of aromatic petroleum hydrocarbons having a boiling point of 410°–460°F. and a specific gravity of 0.81.

The copper content of the aqueous raffinate following the five stages of separation was only 0.001 grams per liter. There was substantially no manganese, nickel or cobalt found in the organic extract phase. The leach liquor at the start of the extraction stages had a pH of about 2 as set out in Example 1 and additional caustic was added to maintain that pH during extraction.

Following the separation from the final settling stage, the organic extract is stripped of copper by being passed countercurrently through 3 stages of a mixer-settler series to the spent acid solution from a copper aqueous electrolysis cell. The aqueous stripping solution had an acid concentration of 6N sulfuric acid.

The aqueous raffinate from the copper extraction step is adjusted to a pH of about 3.5 by the addition of 2N caustic solution. The resulting aqueous solution was extracted with a solution containing 10 percent by volume of triisooctylamine in kerosene, in a five-stage, countercurrent mixer-settler system. The aqueous-to-organic volume ratio in the extraction system was 1:2. The organic phase amine extract contains substantially all of the cobalt from the aqueous solution plus a minor proportion of the manganese. Manganese is then selectively stripped from the organic extract with an aqueous solution containing 6N hydrogen chloride in a 3-stage mixer-settler system, with an aqueous-to-organic volume rate of 1:2. The cobalt is then stripped from the organic extract utilizing the weakly acidic aqueous solution from a cobalt electrolytic cell having a pH of 2.

The concentration of the cobalt in the aqueous stripping solution can be increased by reextracting the cobalt from the weakly acidic aqueous solution using a dialkyl phosphoric acid, e.g., di-(2-ethylhexyl)-phosphoric acid in a solution of 10 volume percent in kerosene which contains 10 percent by volume isodecanol. The aqueous solution is maintained at a pH of 4 during this extraction. The cobalt is then stripped from the organic extract using a smaller proportion of the electrolyte solution from the cobalt electrolytic cell to which has been added HCl to bring it to a pH of 1.

The original cobalt raffinate is then extracted utilizing a 10 percent solution of 7[3-(5,5,7,7 tetra-methyl-1-octenyl)]-8-hydroxyquinoline in kerosene which contains 10 percent by volume isodecanol. The aqueous raffinate is maintained at a pH of about 3.5 during the extraction of nickel by the addition of 2N sodium hydroxide solution. The nickel is stripped from the organic extract using electrolyte from a nickel electrolytic cell containing 3N hydrochloric acid.

EXAMPLE 2

The procedure of Example 1 is repeated and the organic extract of the copper raffinate, the extract containing cobalt and manganese, is stripped with an aqueous solution at a pH of 3.0 to strip out all of the cobalt and manganese together. The aqueous stripping solution containing the cobalt and manganese is maintained at the same pH and is contacted with a 10 percent by volume solution of di-(2-ethylhexyl)-phosphoric acid in a countercurrent, 5-stage mixer-settler system to extract manganese. The manganese is stripped from the organic extract solution with an aqueous solution having a pH of 1.

The cobalt is then concentracted by further extraction with di-(2-ethylhexyl)-phosphoric acid as set forth in Example 1.

EXAMPLE 3

The procedure of Example 1 is repeated and an organic extract phase containing cobalt and manganese is obtained. The cobalt and manganese are stripped together from this extract phase utilizing an acid solution, as in Example 2, with a pH of 3.

The aqueous stripping phase, containing the cobalt and manganese, is then mixed with 2Normal caustic to a pH of 4, which is maintained during the extraction with an organic extractant comprising a 10 percent by volume solution of 5,8-di-ethyl-7-hydroxy-dodecane-6-oxime (LIX-64N) in kerosene plus 10 percent by volume of isodecanol. The extraction is carried out in a 3-stage, countercurrent mixer-settler operation, at an organic-to-aqueous volume ratio of 2:1. The cobalt is stripped from the organic extract phase utilizing an aqueous solution of 20 percent HCl by weight. The cobalt-hydrochloric acid solution is then contacted with a solution of 10 percent triisooctylamine in kerosene, which also contains 12 percent by volume isodecanol. The cobalt is then stripped from the organic TIOA extract utilizing the spent electrolyte from a cobalt electrolysis cell.

The patentable embodiments of this invention which are claimed are as follows:

1. A process for the separation of individual metal values from an aqueous solution comprising a mixture of dissolved metal values, as the halides, the solution comprising as the primary metal value, manganese, and as secondary metal values, cobalt and nickel, the process comprising: (1) extracting cobalt halide from the aqueous solution with an organic amine solution, the amine being selected from the group consisting of secondary amines, tertiary amines and quaternary amines, so as to form an organic amine solution extract containing cobalt tetrahalide complex and some manganese, and an aqueous first raffinate, substantially depleted in cobalt halide; (2) separating the cobalt and manganese values from the organic amine extract into individual aqueous solutions by selectively stripping the manganese value from the extract with from about 1 to about 12N HCl aqueous solution to form an aqueous solution of manganese halide and an organic solution substantially depleted in manganese value and then stripping the cobalt value from the organic solution using an aqueous solution having a pH of not greater than about 5, to form an aqueous solution of cobalt halide; (3) extracting the nickel from the first raffinate with a liquid ion exchange agent to form an aqueous second raffinate containing manganese halide and substantially depleted in nickel value and an organic extract containing the nickel value; and (4) stripping the nickel value from the organic extract with an acidic aqueous solution.

2. The process of claim 1 wherein the aqueous solution of step 1 has a concentration of halide ions of at least about 2N.

3. The process of claim 1, wherein the pH of the first raffinate is adjusted to within the range of about 3 to about 6 prior to extracting the nickel and wherein the liquid ion exchange agent is selected from the group consisting of α-hydroxy oximes and hydrocarbon-substituted 8-hydroxyquinolines.

4. The process of claim 1, wherein the halides comprise chlorides.

5. A process for the separation of individual metal values from an aqueous solution comprising a mixture of dissolved metal values, as the halides, the solution comprising as the primary value, manganese, and, as secondary metal values cobalt and nickel, the process comprising: (1) extracting cobalt halide from the aqueous solution with an organic amine solution, the amine being selected from the group consisting of secondary amines, tertiary amines and quaternary amines, so as to form an organic amine solution extract containing a cobalt tetrahalide complex and some manganese, and an aqueous first raffinate substantially depleted in cobalt halide; (2) separating the cobalt and manganese values from the organic amine extract by simultaneously stripping the cobalt and manganese together from the amine utilizing a water solution, so as to form an aqueous strip solution containing manganese halide and cobalt halide, and separating the cobalt and manganese metal values from the aqueous strip solution by selectively extracting one of the cobalt or manganese values therefrom, using an organic extract selective for one of the metal values, and then stripping the extracted metal value into a separate acidic aqueous solution, thereby forming two separate aqueous solutions of the individual cobalt and manganese values; (3) extracting the nickel from the first raffinate with a liquid ion exchange agent to form an aqueousj second raffinate containing manganese halide and substantially depleted in nickel value and an organic extract containing the nickel value; and (4) stripping the nickel value from the organic extract with an acidic aqueous solution.

6. The process of claim 5 wherein the cobalt and manganese are separated from the aqueous solution by (a) adjusting the pH to a value in the range of from about 3.5 to about 6; (b) selectively extracting the cobalt from the aqueous solution with a liquid ion exchange agent selected from the group consisting of α-hydroxy oximes and hydrocarbon-substituted 8-hydroxyquinolines to form an aqueous raffinate substantially depleted in cobalt and an organic extract containing cobalt and substantially free from manganese; and (c) stripping the cobalt from the extract with an aqueous solution containing a hydrogen ion concentration of at least 6 Normal and a halide ion concentration of at least 6 Normal.

7. The process of claim 5 wherein the cobalt and manganese are separated from the aqueous solution by (a) adjusting the pH of the aqueous solution to a value of not greater than about 3.5, (b) extracting manganese from the aqueous solution with an organic solution of a phosphoric acid diester to form an organic extract containing the manganese and a cobalt-containing manganese raffinate substantially free from manganese and (c) stripping the manganese from the organic extract using an acidic aqueous solution.

8. The process of claim 5, wherein the halides comprise chlorides.

9. The process of claim 5, wherein the pH of the first raffinate is adjusted to within the range of about 3 to about 6 prior to extracting the nickel and wherein the liquid ion exchange agent is selected from the group consisting of α-hydroxy oximes and hydrocarbon-substituted 8-hydroxyquinolines.

10. A process for the separation of nickel and cobalt values found in ocean floor nodule ore, the ore comprising, as major components, the oxide of manganese and iron and, as secondary components, compounds of copper, cobalt and nickel, the process comprising the steps of: (a) reacting the nodule ore with a halide-forming agent under reducing conditions to form a mixture comprising water-soluble halides of divalent manganese, trivalent iron, copper, nickel and cobalt; (b) separating the iron from the remaining salts and forming an aqueous solution of the water-soluble metal halides; c) adjusting the pH of the aqueous solution to a value of not greater than about 2.5; (d) contacting the aqueous solution with a liquid ion exchange extracting medium immiscible with water, the medium comprising an extracting agent designed and adapted to extract copper selectively from the solution, until the aqueous solution is substantially depleted in copper, thus forming an organic extract containing the copper value and a first aqueous raffinate solution substantially depleted in copper; (e) extracting cobalt halide from the first raffinate with an organic amine solution, the amine being selected from the group consisting of secondary amines, tertiary amines and quaternary amines, so as to form an organic amine solution extract containing a cobalt tetrahalide complex and some manganese, and an aqueous second raffinate, substantially depleted in cobalt halide; (f) separating the cobalt and manganese values from the organic amine extract into individual aqueous solutions by selectivey stripping the manganese value from the extract with from about 1 to about 12 N HCl aqueous solution to form an aqueous solution of manganese halide and an organic solution substantially depleted in manganese value, and then stripping the cobalt value from the organic solution using an aqueous solution having a pH of not greater than about 5, to form an aqueous solution of cobalt halide; (g) extracting the nickel from the second raffinate with a liquid ion exchange agent to form an aqueous third raffinate containing manganese halide and substantially depleted in nickel value and an organic extract containing the nickel value; and (h) stripping the nickel values from the organic extract with an acidic aqueous solution.

11. A process for the separation of nickel and cobalt values found in ocean floor nodule ore, the ore comprising as major components the oxides of manganese and of iron and as secondary components, compounds of copper, cobalt and nickel, the process comprising the steps of: (a) reacting the nodules with a halide forming agent under reducing conditions to form a mixture comprising water soluble halides of divalent manganese, trivalent iron, copper, nickel and cobalt; (b) separating the iron from the remaining salts and forming an aqueous solution of the water-soluble metal halides; (c) adjusting the pH of the aqueous solution to a value of not greater than about 2.5; (d) contacting the aqueous solution with a liquid ion exchange extracting medium immiscible with water, the medium comprising an extracting agent designed and adapted to extract copper selectively from the solution, until the aqueous solution is substantially depleted in copper, thus forming an organic extract containing the copper value and a first aqueous raffinate solution substantially depleted in copper; (e) extracting cobalt halide from the first raffinate with an organic amine solution, the amine being selected from the group consisting of secondary amines, tertiary amines and quaternary amines, so as to form an organic amine solution extract containing a cobalt tetrahalide complex and some manganese, and an aqueous second raffinate, substantially depleted in cobalt halide; (f) separating the cobalt and manganese values from the organic amine extract by simultaneously stripping the cobalt and manganese together from the amine, utilizing a water solution, so as to form an aqueous strip solution containing manganese halide and cobalt halide, and separating the cobalt and manganese metal values from the aqueous strip solution by selectively extracting one of the cobalt or manganese values therefrom, using an organic extract selective for one of the metal values, and then stripping the extracted metal values into a separate acidic aqueous solution, thereby forming two separate aqueous solutions of the individual cobalt and manganese values; (g) extracting the nickel from the second raffinate with a liquid ion exchange agent to form an aqueous third raffinate containing manganese halide and substantially depleted in nickel halide and an organic extract containing the nickel values; and (h) stripping the nickel value from the organic extract with an acidic aqueous solution.

* * * * *

PO-1050
(5/69)

UNITED STATES PATENT OFFICE
CERTIFICATE OF CORRECTION

Patent No. 3,854,851      Dated December 17, 1974

Inventor(s) Paul H. Cardwell, et al

It is certified that error appears in the above-identified patent and that said Letters Patent are hereby corrected as shown below:

Claim 10, line 3 (column 13, line 35), change "oxide" to --oxides--

Claim 11, line 8 (column 14, line 22), change "water soluble" to read --water-soluble--

Signed and Sealed this twenty-third Day of September 1975

[SEAL]

Attest:

RUTH C. MASON
Attesting Officer

C. MARSHALL DANN
Commissioner of Patents and Trademarks